June 13, 1967 R. T. TOWNSEND 3,324,915
SKIN SPREADING MEANS FOR SKINNING MACHINES
Filed Nov. 16, 1964
3 Sheets-Sheet 1

Inventor
Ray T. Townsend
by Bair, Freeman & Molinare
Attorneys

June 13, 1967  R. T. TOWNSEND  3,324,915
SKIN SPREADING MEANS FOR SKINNING MACHINES
Filed Nov. 16, 1964  3 Sheets-Sheet 2
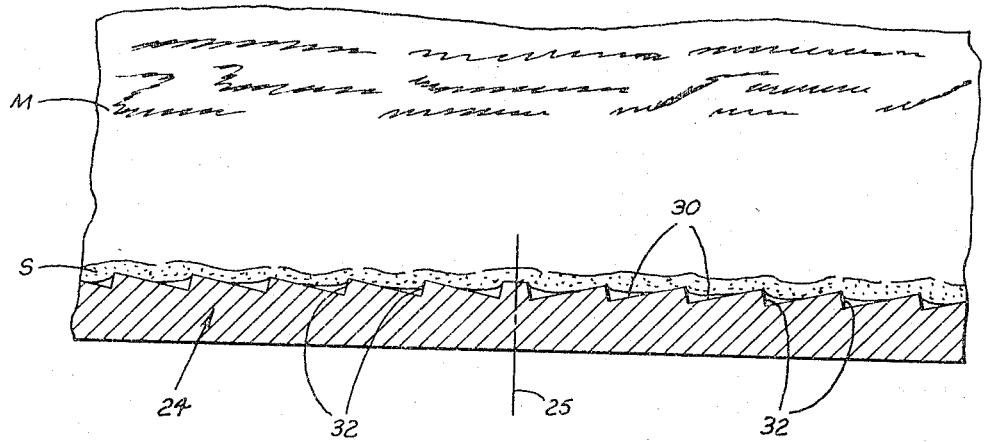
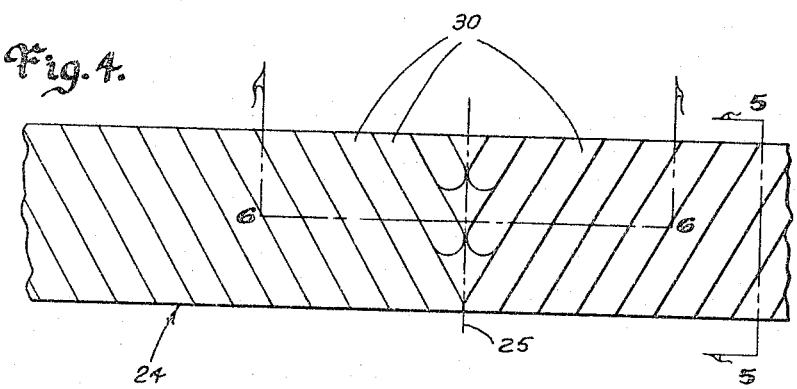
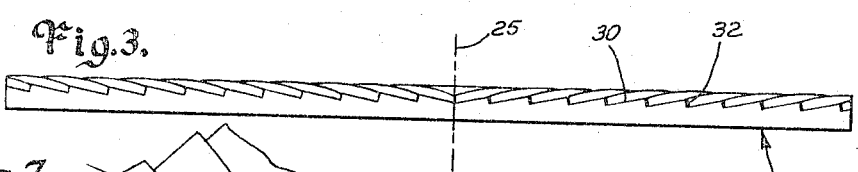
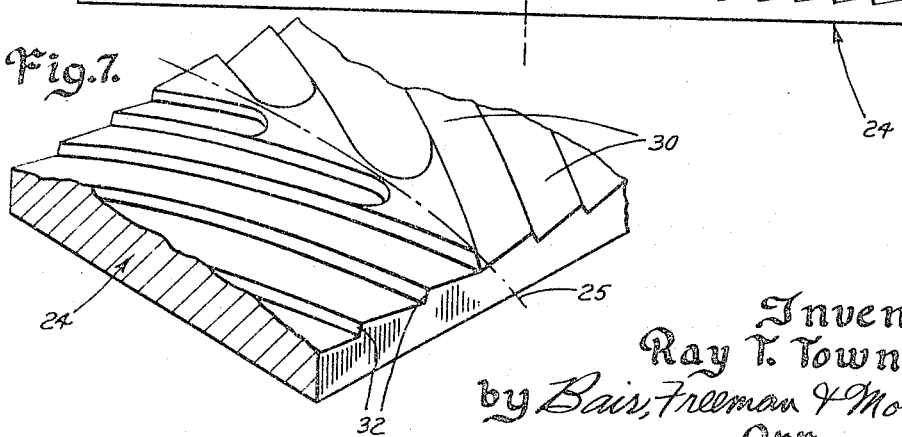
Inventor
Ray T. Townsend
by Bair, Freeman & Molinare
Attorneys

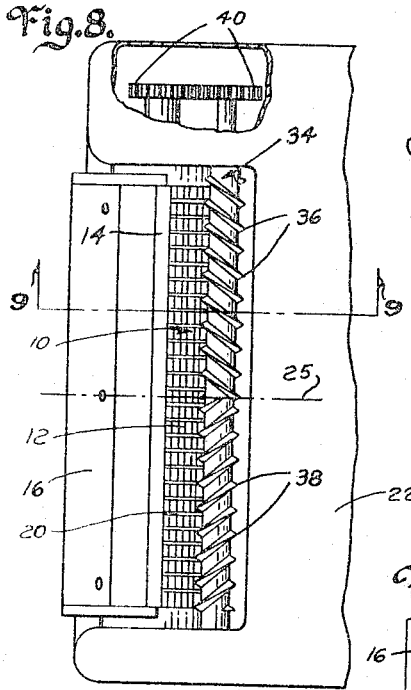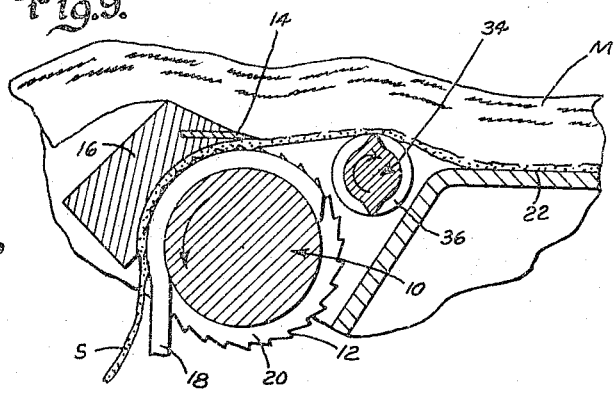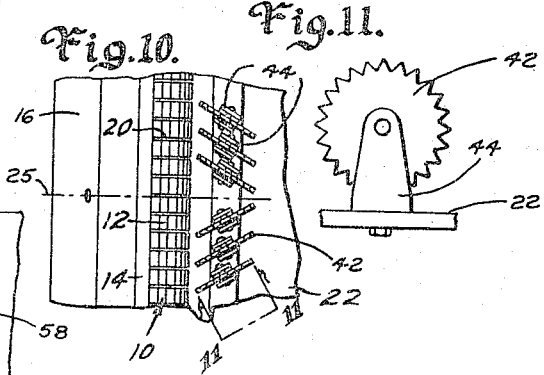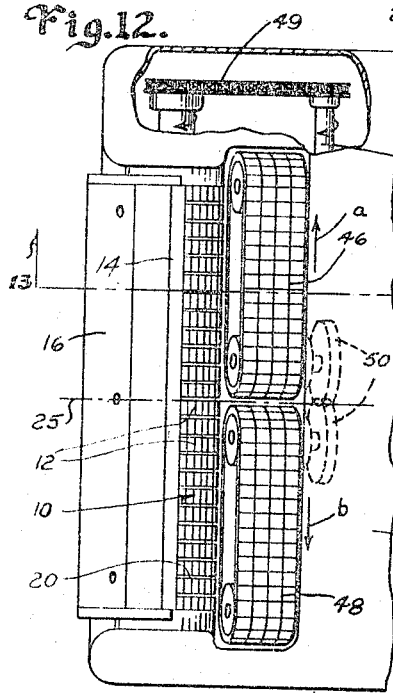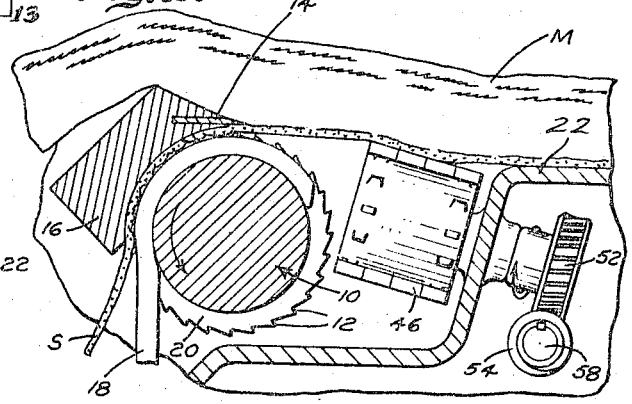

United States Patent Office 3,324,915
Patented June 13, 1967

3,324,915
SKIN SPREADING MEANS FOR SKINNING MACHINES
Ray T. Townsend, Des Moines, Iowa, assignor to Townsend Engineering Company, Des Moines, Iowa, a corporation of Iowa
Filed Nov. 16, 1964, Ser. No. 411,333
1 Claim. (Cl. 146—130)

This invention relates to skin spreading means for skinning machines which operate to skin slabs of meat such as bacon or the like, machines of this character being shown, for instance, in my Patents No. Re. 23,222 and No. 2,522,728.

One object of the invention is to provide skin spreading means which may be located between the feed table and the skinning mechanism of a skinning machine and which tends to spread the skin or stretch it laterally just before it enters the skinning mechanism, the design being particularly advantageous in connection with that type of skinning mechanism comprising a rotating serrated skin-gripping roll and a shoe-mounted skinning blade for parting the skin from the slab of meat as the roll pulls the skin and thereby the slab of meat through the machine. The purpose of my skin spreading means is to stretch or spread the skin laterally of its direction of travel in order to facilitate its entry between the skinning knife and the skin-gripping roll of the skinning mechanism.

Another object is to provide spreading means in the form of a laterally extending stationary bar located between the feed table and the skinning mechanism, and which has a series of undulations or grooves of such cross sectional shape and of such inclination relative to the direction of travel of the skin that they effect spreading of the skin by urging the part of it on the right side of a median line of travel in a right-hand direction and part of it on the left-hand side in a left-hand direction.

Still another object is to provide a modified form of skin spreading means in which a roller between the feed table and the skinning mechanism is rotated under the skin in a direction opposite the travel of the skin into the skinning mechanism and has a left-hand spiral ridge on the right half thereof and a right-hand spiral ridge on the left-hand half thereof to effect such spreading of the skin.

A further object is to provide another modified form of the invention comprising a series of discs having serrated edges to be engaged by the skin, the discs being located between the feed table and the skinning mechanism, and set at angles diverging on opposite sides of a median line of the machine in the direction of travel of the skin.

Still a further object is to provide a further modified form of the invention comprising conveyor-like devices having skin engaging surfaces travelling in directions away from each other and engaging the portion of the skin between the feed table and the skinning mechanism for spreading the skin.

With these and other objects in view, my invention consists in the construction, arrangement and combination of the various parts of my skin spreading means for skinning machines, whereby the objects above contemplated are attained, as hereinafter more fully set forth, pointed out in my claim and illustrated in detail on the accompanying drawings, wherein:

FIG. 3 is a further enlarged front elevation of skin spreading means in the form of a stationary spreader bar as illustrated in FIGS. 1 and 2;

FIG. 4 is a detail plan view of FIG. 3;

FIG. 5 is a sectional view on the line 5—5 of FIG. 4;

FIG. 6 is a further enlarged sectional view on the line 6—6 of FIG. 4;

FIG. 7 is a perspective view of the central portion of the spreader bar;

FIG. 8 is a plan view of a modified form of skin spreading means;

FIG. 9 is an enlarged sectional view thereof on the line 9—9 of FIG. 8;

FIG. 10 is a plan view of another modified form of the invention;

FIG. 11 is a detail as taken on the line 11—11 of FIG. 10;

FIG. 12 is a plan view of a third modification of my skin spreading means, and

FIG. 13 is an enlarged sectional view on the line 13—13 of FIG. 12.

Figure 2:
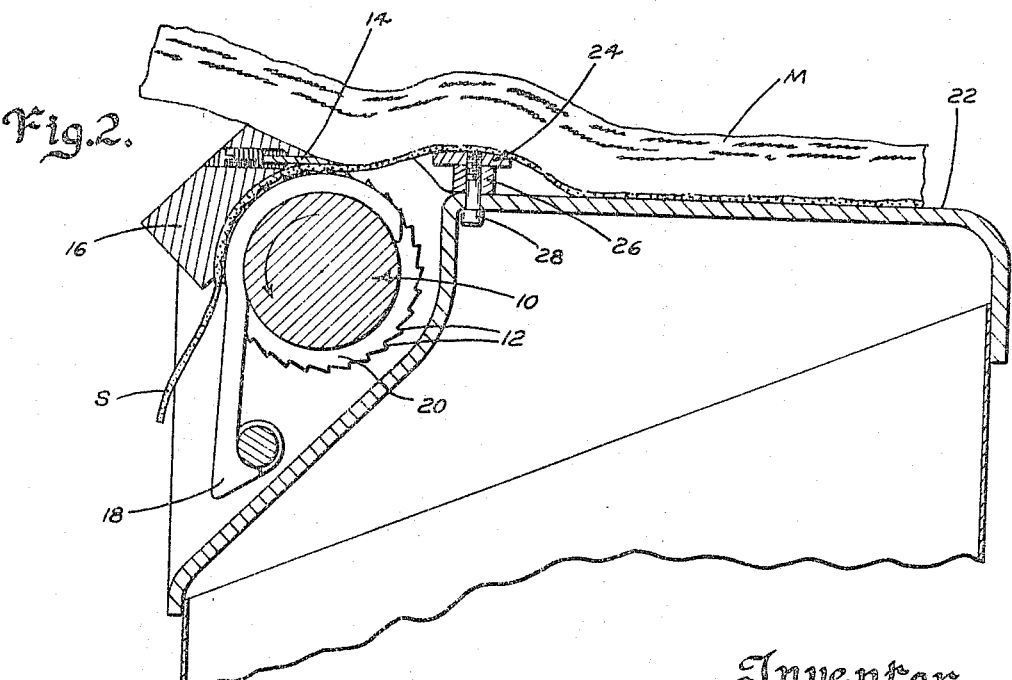
FIG. 2 is an enlarged sectional view on the line 2—2 of FIG. 1.

On the accompanying drawings I have used the reference numeral 10 to indicate a skin-gripping roll which is suitably rotated in a counterclockwise direction for gripping the skin S of a slab of meat M for removing the skin from the slab. A skinning blade 14 coacts with the slab and the skin and is carried by a shoe 16. The blade 14 severs the skin from the meat as shown in FIG. 2 and as described in detail in my prior patents. Also as disclosed therein, the roll 10 is provided with serrations or teeth 12 to effect the skin-gripping operation, and with a series of grooves 20 in which strippers 18 are located for stripping the skin from the roll. The usual feed table 22 is also provided as part of the skinning machine. The roll 10, the shoe 16 and the blade 14 constitute broadly "skinning mechanism" as referred to in the following description and claim.

In my prior machines, the slab of meat is fed directly from the table 22 into the skinning mechanism. The slabs may be manually fed or may be automatically fed from a conveyor or the like, and may be held to the table by gravity alone or assisted by hold-down means as shown in my Patents No. 2,578,952 and No. 2,839,113. I have found that better skinning action can be secured by spreading the skin laterally or sidewise before it enters the skinning mechanism.

Figure 1:
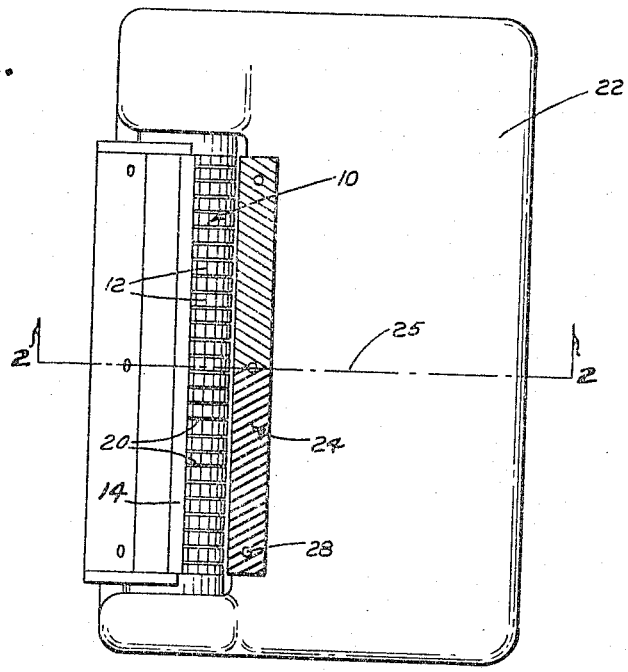
FIG. 1 is a plan view of a portion of a skinning machine and one form of my skin spreading means in association therewith.

To accomplish this spreading action, I show in FIGS. 1 to 7, inclusive, a spreader bar 24 which may be supported on the feed table 22 as by means of three spacers 26 and three screws 28. The bar is thus stationary with respect to the table. The bar 24 is designed so that it effects a spreading action. One design comprises ratchet-like serrations 30 as shown particularly in FIGS. 3 to 7, inclusive, wherein their steep faces 32 are directed toward the right in the right-hand half of the bar and toward the left in the left-hand half thereof. Accordingly, as the slab of meat and its skin S are pressed against the spreader bar 24 as in FIG. 6, and due to opposite inclination (in plan view) of the serrations in the right and left-hand half of the bar as shown in FIGS. 1, 4 and 7, a spreading action to the right and left of a median line 25 of the machine occurs so that the skin is stretched and more properly feeds into the space between the skin gripping roll 10 and the skinning blade 14. Thus by the addition of a simple stationary spreader bar of serrated-face character, the skin spreading action may be automatically had as the skin progresses through the machine.

The skin spreading means may take on other forms such as shown in FIGS. 8 to 13. Some of these, particularly in conjunction with certain types of meat slabs, are more effective than the stationary spreader bar 24. In FIGS. 8 and 9 a roller 34 is shown located between the feed table 22 and the skin gripping roll 10, and is provided in the right-hand half with a left-hand spiral ridge 36 and in the left-hand half with a right-hand spiral ridge 38. The roller 34 is driven independently of the skin gripping roll 10 or as by gears 40 therefrom and the direction of rotation is opposed to the direction of travel of the skin as it enters the skinning mechanism. The opposite inclination in the proper direction of the spiral ridges 36 and 38 will tend to spread the skin laterally during the meat slab feeding operation.

FIGS. 10 and 11 shows a modification in which a plurality of discs 42 are provided which may be mounted for free rotation in brackets 44. The discs may have their edges serrated as shown in FIG. 11 so that the skin in passing thereover more effectively imparts rotation to the discs. It will be noted in FIG. 10 that the discs are inclined in plan view so as to diverge on opposite sides of the median line 25 in the direction of skin travel. Thus the discs act in a manner similar to the spiral ridges 36 and 38 of FIG. 8 and the serrations 30 of the first form of the invention to effect the lateral spreading action on the skin S as it passes thereover.

FIGS. 12 and 13 show another way in which skin spreading can be accomplished. A right-hand conveyor 46 and a left-hand conveyor 48 having their upper stretches travelling in the direction of the arrows $a$ and $b$ in FIG. 12 cause the spreading action. The conveyors may be suitably roughened or provided with ridges or the like to engage the skin with sufficient traction to cause the spreading action, and may be geared together as at 50 for opposite travel according to the arrows $a$ and $b$. The conveyors 46 and 48 may be driven either independently or from the skin gripping roll 10 as by means of a chain 49 (FIG. 12), and a worm gear and worm drive 52, 54 (FIG. 13). The worm 54 is mounted on a shaft 58 driven by a chain 49 as illustrated.

From the foregoing specification it will be obvious that spreading the skin of meat slabs as the slabs are fed into the skinning mechanism of a skinning machine. The spreading means may be accomplished by a variety of mechanisms as disclosed throughout the figures of the drawings and in all cases the skin on the right side of a median line is spread toward the right and on the left side of such median line is spread toward the left thereby tending to stretch the skin laterally to facilitate the feeding of the skin into the skinning mechanism and to facilitate proper skinning action thereof. While a table 22 has been described in the foregoing disclosure, it is not an essential element of the skinning machine when provided with skin spreading means such as disclosed herein. The slab of meat can be initially fed by the operator against the skin spreading means which is a type of operation suitable for hams whereas the table is advantageous for supporting slabs of bacon which are relatively long and may therefore have most of their weight supported on the table as the front end is fed over the skin spreading means.

Some changes may be made in the construction and arrangement of the parts of my skin spreading means without departing from the real spirit and purpose of my invention, and it is my intention to cover by my claim any modified forms of structure or use of mechanical equivalents which may reasonably be included within its scope.

I claim as my invention:

For use with that type of skinning machine having skin gripping means, means to separate the flesh from the skin of a slab of meat or the like, and a table having an upper surface aligned with said skin gripping means for directing the unskinned slab toward said skin gripping means; skin spreading means engageable with the skin as it leaves said table and before it is engaged by said skin gripping means for spreading the skin laterally of its direction of travel as it moves past said skin spreading means and into the skinning mechanism, said skin spreading means comprising a laterally extending bar having an undulating upper skin engagement surface in which the undulations are inclined to diverge forwardly relative to said direction of travel, said undulations in cross section longitudinally of said skin spreading bar being ratchet-like in character with their steeper slopes each side of a median line facing that end of the bar on which they are located, said bar being mounted on said table so as to have its skin engaging surface elevated above said table surface whereby a slab of meat held down against said table surface will bow up over said bar and be held in forcible contact therewith, said skin engaging surface of said skin spreading bar being rounded laterally of the length of the bar to facilitate bowing of the slab of meat thereover and the resultant forcible contact of the slab therewith.

References Cited
UNITED STATES PATENTS

| | | | |
|---|---|---|---|
| 12,114 | 12/1854 | Pratt | 69—13 |
| 95,780 | 10/1869 | Cunningham | 69—13 |
| 982,523 | 1/1911 | Norgrave | 69—11 |
| 1,648,845 | 11/1927 | Harding | 69—11 |
| 2,330,271 | 9/1943 | Cutler | 69—43 |
| 2,590,747 | 3/1952 | Birdseye | 146—130 |

DONALD R. SCHRAN, *Primary Examiner.*